United States Patent [19]

Masakawa

[11] Patent Number: 4,926,402
[45] Date of Patent: May 15, 1990

[54] METHOD OF RECORDING BIVALENT SIGNALS ON OPTO-MAGNETIC RECORD MEDIUM

[75] Inventor: Yoshihiko Masakawa, Hachioji, Japan

[73] Assignee: Olympus Optical Co., Ltd., Japan

[21] Appl. No.: 241,926

[22] Filed: Sep. 8, 1988

[30] Foreign Application Priority Data

Sep. 14, 1987 [JP] Japan ................... 62-228369

[51] Int. Cl.⁵ .................. G11B 11/12; G11B 13/04
[52] U.S. Cl. ............................ 369/13; 365/122; 360/59
[58] Field of Search ................... 369/13; 360/59, 114, 360/131; 365/122

[56] References Cited

U.S. PATENT DOCUMENTS 4,858,212  8/1989  Takahashi et al. ................... 369/13

FOREIGN PATENT DOCUMENTS 59-113506  6/1984  Japan .
61-104444  5/1986  Japan .
62-154347  7/1987  Japan .

OTHER PUBLICATIONS

Krumme et al, "New Magneto-Optic Mem. Concept Based on Compensation Wall Domains", Appl. Phys. Lett., vol. 23, No. 10 (11/10/73), pp. 576–578.
Electronics, "Mag. Op. Mem. Begin to Look Like a Good Bet–Simple Nikon Tech. Permits Erase and Write in One Pass" Electronics, Apr. 16, 1987.

Primary Examiner—Steven L. Stephan
Assistant Examiner—Hoa Nguyen
Attorney, Agent, or Firm—Arnold, White & Durkee

[57] ABSTRACT

In a method of recording, in the over-write mode, bivalent signals "0" and "1" on an opto-magnetic record medium having a ferrimagnetic material whose compensation temperature is higher than a room temperature, but is lower than a Curie temperature, an external magnetic field is applied to the record medium, and a laser light beam is modulated in accordance with the bivalent signals. When the bivalent signal "0" is to be recorded, the laser light beam is set to a lower power level and the ferrimagnetic material of the record medium is heated to a temperature higher than the room temperature, but lower than the compensation temperature so that the ferrimagnetic material is magnetized in the same direction as the external magnetic field. When the bivalent signal "1" is to be recorded, the laser light beam is changed into a high power level and the ferrimagnetic material is heated above the Curie temperature so that the ferrimagnetic material is magnetized in the direction opposite to that of the external magnetic field.

8 Claims, 3 Drawing Sheets

METHOD OF RECORDING BIVALENT SIGNALS ON OPTO-MAGNETIC RECORD MEDIUM

BACKGROUND OF THE INVENTION

Field of the Invention and Related Art Statement

The present invention relates to a method of recording bivalent signals on an opto-magnetic record medium and more particularly, to a method of overwriting bivalent signals on an opto-magnetic record medium without effecting the erasing.

The above mentioned method of over-writing the bivalent signals on the opto-magnetic record medium without erasing previously recorded signals is described in, for instance Japanese Patent Publication Kokai Sho 59-113,506, Sho 61-104,444 and Sho 62-154,347. In the opto-magnetic recording method disclosed in the Japanese Patent Publication Kokai Sho 59-113,506, the bivalent signals recorded on the opto-magnetic record medium are rewritten by changing the intensity of a laser light beam, such that an intensity $P_1$ of the laser light beam for recording one of the bivalent signals "1" is larger than an intensity $P_0$ of the laser light beam for recording the other of the bivalent signals "0"; Radii Rc ($P_1$) and Rc ($P_0$) of domains on the record medium, whose magnetization becomes zero due to the fact that the temperature of these domains is increased more than the Curie temperature by the irradiation of the laser light beam having the intensities $P_1$ and $P_0$, satisfy the condition of Rc ($P_1$)>Rc ($P_0$); and in the domain upon which the "1" writing laser light having the intensity $P_1$ is made incident, there is formed a magnetization inverse domain having a radius $R_w$ (Rw<Rc ($P_0$)), but in the domain upon which the "0" writing laser light of $P_0$ is made incident, the magnetization is not inverted. In the present specification, said radii RC ($P_1$) and Rc ($P_0$) are also called magnetization lost radii for the sake of the simplicity.

In the known opto-magnetic recording method described in the Japanese Patent Publication Kokai Sho 62-154,347, use is made of a record medium comprising an opto-magnetic recording layer, bias magnetic layer made of a ferrimagnetic material whose compensation temperature is higher than a room temperature, but lower than the Curie temperature and a non-magnetic layer interposed between said opto-magnetic recording layer and bias magnetic layer, and the over-writing is carried out by changing the intensity of laser light between two power levels, while no external magnetic field is applied to the record medium. In the first power level, the opto-magnetic recording layer is heated near or above the Curie temperature and the bias magnetic layer is heated above the compensation temperature thereof, while in the second power level, the opto-magnetic recording layer is heated near or above the Curie temperature and the bias magnetic layer is heated below the compensation temperature.

In the above mentioned known methods, the radii Rc ($P_1$) and Rc ($P_0$) of the magnetization lost domains largely depend upon the temperature of the record medium, i.e., operating or room temperature. When the temperature of the record medium is high, the spot radius becomes large, so that in case of recording the bivalent signal "0", the radius Rc ($P_0$) of the magnetization lost domain exceeds a reference value and thus the magnetization inverse domain might be formed, and in case of recording the bivalent signal "1", the Radius Rc ($P_1$) of the magnetization lost domain becomes large and the radius Rw of the magnetization inverse domain also becomes large, and therefore when the temperature of the record medium is decreased in case of rewriting the signal "1", in the relevant domain into the signal "0", the radius Rc ($P_0$) might be smaller than Rw so that there might remain a non-erased area. A similar disadvantage also occurs in the known method disclosed in the above mentioned Kokai Sho 62-154,347. Further, use is made of the record medium utilizing the demagnetizing field; and thus, when the temperature of the record medium becomes higher and the coercive force becomes smaller, the direction of the magnetization in the record medium might be influenced to a large extent by a magnetic field leaked out of a magnetic driving device for moving an objective lens in order to effect the focusing and tracking control. This results in the information signal not being recorded accurately.

SUMMARY OF THE INVENTION

The object of the present invention is to provide a novel and useful method of recording bivalent signals on an opto-magnetic record medium, in which the bivalent signals can be positively and accurately overwritten on the record medium without being affected by the variation of the operating temperature and the magnetic field leaked out of the objective lens driving device.

According to the invention, a method of recording bivalent signals on an opto-magnetic record medium including a ferrimagnetic material whose compensation temperature is higher than an operating temperature, but is lower than a Curie temperature, by projecting a laser light beam upon the record medium and applying an external magnetic field, comprises:

modulating the intensity of the laser light beam in accordance with one of the bivalent signals into a high power level by means of which the ferrimagnetic material is heated to a first temperature which is higher than the Curie temperature, so that said one of the bivalent signals is recorded under such a condition that the direction of the magnetization is determined at a temperature higher than the compensation temperature, but lower than the Curie temperature; and modulating the intensity of the laser light beam in accordance with the other of the bivalent signals into a low power level by means of which the ferrimagnetic material is heated to a second temperature which is higher than the operating temperature, but is lower than the compensation temperature, so that said other of the bivalent signals is recorded under such a condition that the direction of the magnetization is determined at a temperature higher than the operating temperature, but lower than the compensation temperature.

DESCRIPTION OF THE PREFERRED EMBODIMENTS

Figure 1A:
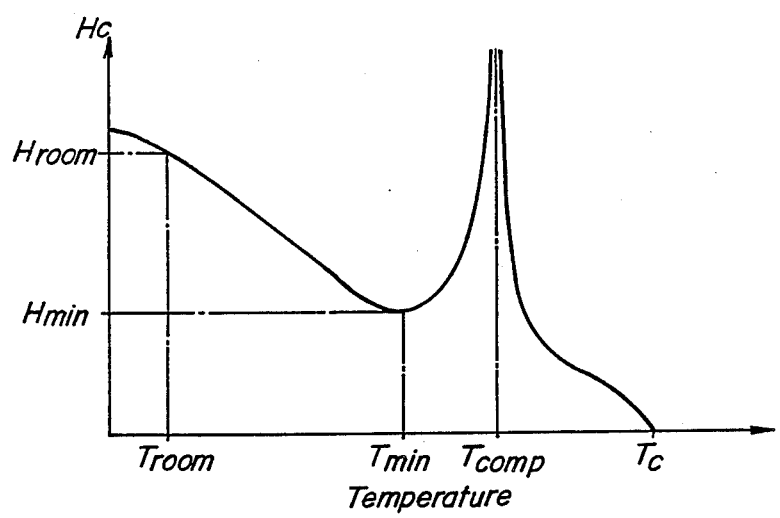
FIGS. 1A and 1B are graphs showing temperature characteristics of the coercive force and the magnetization, respectively of the ferrimagnetic material of the record medium for use in the method according to the invention.
Figure 1B:
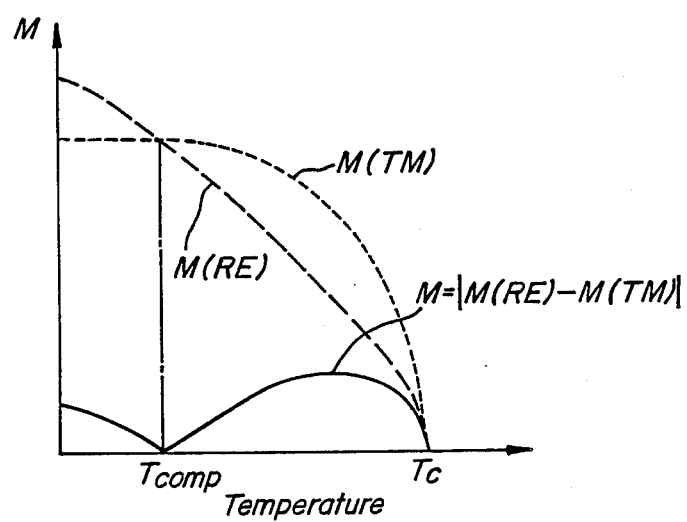
Figure 2:
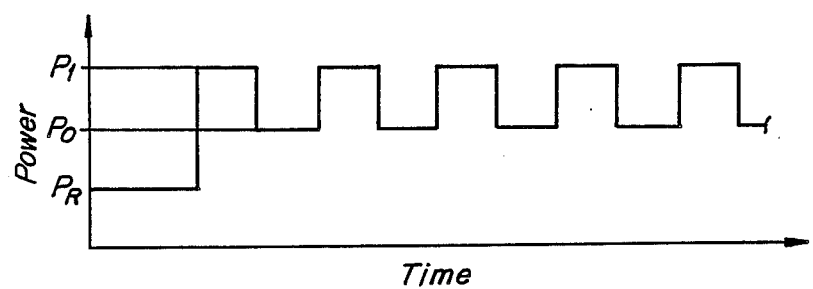
FIG. 2 is a graph representing the change in the power level of the writing laser beam.

FIG. 1A is a graph showing a temperature characteristic of the coercive force $H_c$ of the ferrimagnetic material whose compensation temperature $T_{comp}$ is higher than the operating or room temperature $T_{room}$, but is lower than the Curie temperature $T_c$. As illustrated in FIG. 1A, the coercive force $H_c$ is decreased in accordance with the increase of the temperature, but is increased abruptly near the compensation temperature $T_{comp}$, and then is decreased again. At the Curie temperature $T_c$, the coercive force Hc becomes zero. FIG. 1B is a graph representing the effective magnetization M of the ferrimagnetic material. In general, the effective magnetization M can be represented by a difference between the magnetization M(RE) of a rear earth metal and the magnetization M(TM) of a transition metal, i.e. $M = |M(RE) - M(TM)|$. The effective magnetization M becomes zero at both the compensation temperature $T_{comp}$ and the Curie temperature $T_c$, and the sign or polarity of the effective magnetization M is reversed at the compensation temperature $T_{comp}$.

According to the invention, use is made of a opto-magnetic record medium including the ferrimagnetic material having the characteristics shown in FIGS. 1A and 1B. In the case of recording the bivalent signals, the record medium is subjected to an external magnetic field having a direction which is opposite to that of the magnetization below the compensation temperature $T_{comp}$, but is the same as that of one of the bivalent signals, e.g. the signal "0". The laser light beam has two power levels, i.e. a low power level $P_0$ for recording the signal "0" and a high power level $P_1$ corresponding to the signal "1". Both of said low and high power levels are higher than a read power level $P_R$ for effecting the reproduction. The lower power level $P_0$ is determined such that the temperature of that part of the record medium which is irradiated by the laser light of the low power level $P_0$ is higher than the room temperature $T_{room}$, but is lower than the compensation temperature $T_{comp}$. The high power level $P_1$ is set such that the temperature at a part of the record medium upon which the laser light of the high power level is made incident is substantially equal to or higher than the Curie temperature $T_c$. Therefore, at the part of the record medium which is irradiated by the laser beam having the low power level $P_0$, the coercive force $H_c$ becomes smaller than a coercive force $H_{room}$ at the room temperature $T_{room}$ and the external magnetic field, so that the direction of the magnetization is made equal to the direction of the external magnetic field and the bivalent signal "0" is recorded. At the part of the record medium upon which the laser light of the high power level $P_1$ is made incident, the temperature of the part is first increased up to the Curie temperature $T_c$ and then is decreased, and under such a condition that the external magnetic field is lower than the minimum coercive force $H_{min}$ within a temperature range from the room temperature to the compensation temperature $T_{comp}$, the magnetization of that part of the record medium is fixed and the direction of the magnetization is made equal to that of the external magnetic field. When the temperature of said part of the record medium is further decreased below the compensation temperature $T_{comp}$, the direction of the magnetization of the relevant part is inversed and becomes opposite to that of the external magnetic field due to the characteristic of the opto-magnetic material. In this manner, the bivalent signal "1" is recorded in the overwrite mode.

Figure 3:
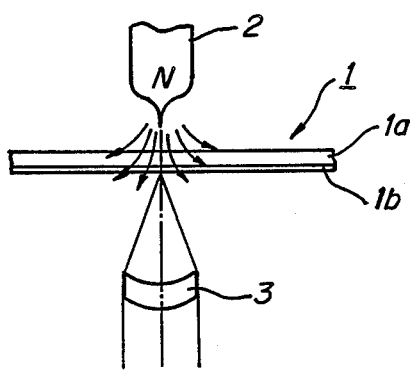
FIG. 3 is a schematic view illustrating a recording apparatus for use in the method according to the invention.

FIG. 3 is a schematic view illustrating an embodiment of the opto-magnetic recording apparatus for carrying out the method according to the invention.

In the present embodiment, use is made of a disc-shaped opto-magnetic record medium 1 which is rotated about its center at a given speed. Above the disc 1 there is arranged a permanent magnet 2, and below the disc there is provided an optical system including an objective lens 3. As is well known in the art, the magnet 2 may be replaced by an electromagnet, and the optical system includes, in addition to the objective lens 3, a laser light source, polarizing element, light detector, etc. The information signal is recorded on the disc 1 by projecting a laser light beam through the objective lens 3, while the external magnetic field is applied by the magnet 2. It should be noted that the optical axis of the objective lens 3 is aligned with a center axis of the magnet 2 which has a substantially conical tip.

The disc-shaped record medium 1 comprises a substrate 1a made of glass and a ferrimagnetic material layer 1b applied on the glass substrate. The ferrimagnetic material layer 1b may be formed by sputtering an alloy of a rear earth metal and a transition metal. In the present embodiment, the ferrimagnetic material layer 1b has a composition of $(Tb_x Dy_{1-x})_y(Fe_zCo_{1-z})_{1-y}$, wherein $0 \leq x \leq 1$, $0.13 \leq y \leq 0.21$ and $0.6 \leq z \leq 1$, and has the following properties. The coercive force $H_{room}$ at the room temperature $T_{room}$ is larger than 14 KOe. The minimum coercive force $H_{min}$ in the temperature range below the compensation temperature is equal to 1 KOe. A temperature $T_{min}$ at which the minimum Coercive force $H_{min}$ appears is equal to 150° C., the compensation temperature $T_{comp}$ is equal to 190° C., and the Curie temperature $T_c$ is equal to 260° C. In the disc substrate 1a there has been previously formed a spiral or concentrical tracking guide groove having a depth of 0.07 μm and a pitch of 1.6 μm.

Figure 4:
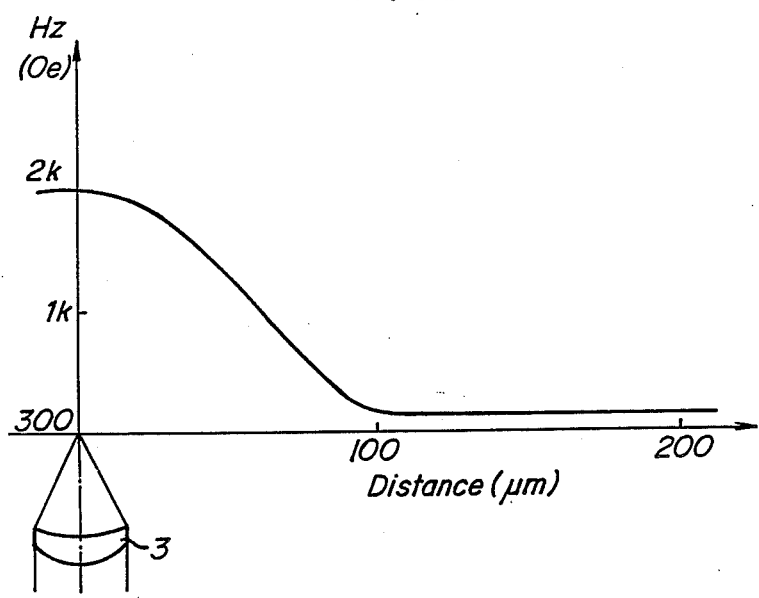
FIG. 4 is a graph showing the distribution of the vertical component of the external magnetic field.

The magnet 2 is separated from the disc 1 by 0.2 mm and is arranged movably together with the optical system including the objective lens 3 in the radial direction of the disc 1. It is also possible to arrange stationarily an elongated magnet in the radial direction of the disc. FIG. 4 is a graph showing the distribution of the vertical component of the external magnetic field generated by the magnet 2. As illustrated in FIG. 4, the external magnetic field Hz has the maximum value of 2 KOe at the center of the light beam and is decreased abruptly in the circumferential direction. In a range which is separated from the beam center by a distance more than 100 μm, the external magnetic field Hz is decreased to about 300 Oe.

The intensity of the laser light beam is modulated in accordance with the bivalent signals to be recorded in such a manner that a part of the ferrimagnetic material layer 1b upon which the laser beam having the low power level $P_0$ is made incident is heated to a temperature $T_0$, $150° C. < T_0 < 190° C.$, and a portion of the ferrimagnetic material layer which is irradiated by the laser beam of the high power level $P_1$ is heated to a temperature $T_1$ higher than the Curie temperature $T_c$ of 260° C. In this embodiment, $P_0 = 6$ mW and $P_1 = 10$ mW, and the a diameter of the laser beam spot on the disc 1 is 1 μm. The laser light is modulated at the recording frequency of 3 MHz.

Figure 5:
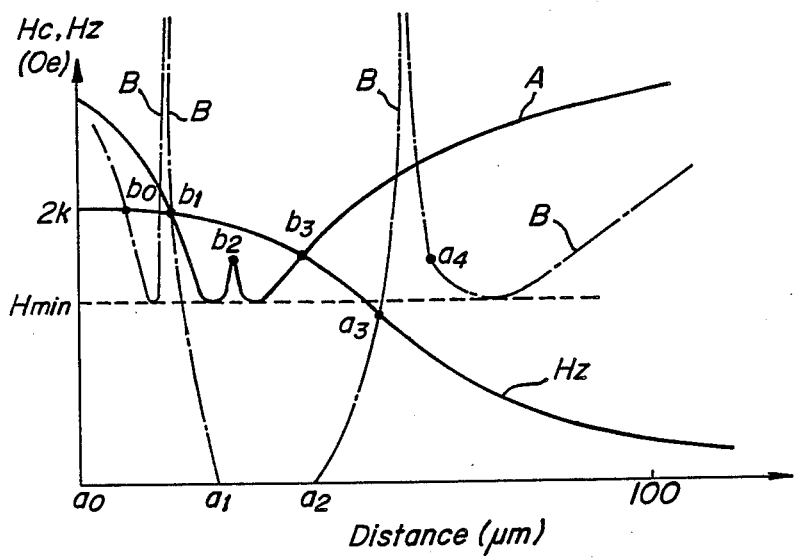
FIG. 5 is a graph showing the relationship between the variation of the coercive force and the external magnetic field at a portion of the record medium upon which the laser light is made incident.

FIG. 5 shows the relationship between the coercive force $H_c$ at the portion of the record medium 1 upon which the laser light beam is made incident and the external magnetic field Hz. The horizontal axis represents the distance from a center point $a_0$ of the laser light spot measured in the circumferential direction of the disc. When the laser light beam having the lower power level $P_0$ for recording the bivalent signal "0" is made incident upon the disc 1, a portion of the disc is heated to the temperature $T_0$ within a range from 150° C. to 190° C. Then the coercive force $H_c$ of the relevant portion of the disc is changed as shown by a solid curve A. That is to say, at a position $b_1$, the coercive force $H_c$ becomes lower than the external magnetic force Hz, and at a position $b_2$ corresponding to the end of the irradiation of the laser light beam, the coercive force $H_c$ becomes higher than the minimum coercive force $H_{min}$ of about 1 KOe, but lower than external magnetic field. While the relevant portion of the disc is naturally cooled, the coercive force $H_c$ becomes higher than the external magnetic field Hz at a point $b_3$. In this manner, during the recording of the bivalent signal "0" with the aid of the lower power level $P_0$, the coercive force $H_c$ becomes smaller than the external magnetic field Hz within a range $b_1$ to $b_3$ in which the magnetization is predominantly determined by the transition metal, so that the opto-magnetic material of the relevant portion of the disc is magnetized in the same direction as the external magnetic field Hz and the bivalent signal "0" is written on the record medium 1. A table 1 shows the direction of the magnetization at the positions $b_1$, $b_2$ and $b_3$ during the recording of the bivalent signal "0".

TABLE 1

| External Magnetic Field | ↓ | | ↓ | | ↓ | | ↓ |
|---|---|---|---|---|---|---|---|
| Position | — | $b_1$ | — | $b_2$ | — | $b_3$ | — |
| Recorded Signal "1" | ↑ | | ↓ | | ↓ | | ↓ |
| "0" | ↓ | | ↓ | | ↓ | | ↓ |

When the bivalent signal "1" is to be written, a portion of the disc 1 irradiated by the laser light beam having the high power level PI is heated to the temperature $T_1$ ($T_1 > T_c$), the coercive force at the relevant portion changes as shown by a chain curve B. That is to say, immediately after the irradiation, the coercive force $H_c$ becomes lower than the external magnetic field Hz at a position $b_0$, and then near the compensation temperature, the coercive force $H_c$ becomes maximum. After that, the coercive force $H_c$ is abruptly decreased and becomes smaller than the external magnetic field Hz at the position $b_1$. When the temperature of the relevant portion of the disc is heated to the Curie temperature $T_c$, the coercive force $H_c$ becomes zero at a position $a_1$. After the irradiation of the laser light beam is stopped, the temperature at the relevant portion of the disc 1 is decreased naturally, and the coercive force $H_c$ is increased from a position $a_3$ at which the temperature equals to the Curie temperature $T_c$, then, Hc becomes higher than the external magnetic field Hz at the position $a_3$ at which the external magnetic field Hz becomes smaller than the minimum coercive force $H_{min}$ (=1 KOe). Near the compensation temperature, the coercive force $H_c$ becomes maximum. After the temperature has been decreased lower than the compensation temperature, the coercive force $H_c$ is always higher than the minimum coercive force $H_{min}$. As explained above, In the case of recording the bivalent signal "1" with the high power level $P_1$, the external magnetic field Hz at the position $a_3$ at which the coercive force $H_c$ becomes larger than the external magnetic field is lower than the minimum coercive force $H_{min}$, so that the magnetization of the opto-magnetic material is predominantly determined by the rear earth metal and the opto-magnetic material is magnetized in the same direction as the external magnetic field. When the temperature of the relevant portion of the disc is decreased lower than the compensation temperature, the magnetization is predominantly determined by the transition metal, and thus the direction of the magnetization is inverted and becomes opposite to that of the external magnetic field. In this manner, the bivalent signal "1" is recorded. The following table 2 expresses the direction of the magnetization at various positions during the recording of the bivalent signal "1" with the high power level $P_1$.

TABLE 2

| External Magnetic Field | ↓ | | ↓ | | ↓ | | ↓ | | ↓ | | ↓ | | ↓ |
|---|---|---|---|---|---|---|---|---|---|---|---|---|---|
| Position | — | $b_0$ | — | $b_1$ | — | $a_1$ | — | $a_2$ | — | $a_3$ | — | $a_4$ | — |
| Recorded "1" | ↑ | | ↓ | | — | | — | | ↓ | | ↓ | | ↑ |
| Signal "0" | ↓ | | ↓ | | — | | — | | ↓ | | ↓ | | ↑ |

After the bivalent signals have been overwritten in the manner explained above, the recorded signal is reproduced with the aid of the laser beam having the read power level $P_R = 1.5$ mW. Then, the reproduced signal having C/N=55 dB can be derived and any non-erased signal is not found.

In the above embodiment, the over-write is carried out with the aid of the laser light beam having the lower power level $P_0$ of 6 mW and the high power level $P_1$ of 10 mW. The following table 3 shows the result of the reproduction in case of effecting the over-write at the recording frequencies of 3 and 4 MHz with the aid of the laser light beam having the low power level $P_0$ of 4-8 mW and the high power level $P_1$ of 5-10 mW. In all cases, the reproduction is performed under the read power level $P_R$ of 1.5 mW.

TABLE 3

| Recording Power | | Recording Frequency | | |
|---|---|---|---|---|
| | | 3 MHz | 4 MHz | |
| | | | | Residual Signal Recorded at 3 MHz |
| $P_0$(mW) | $P_1$(mW) | C/N(dB) | C/N(dB) | C/N(dB) |
| 4 | 5 | 0 | 0 | 0 |
| | 6 | 0 | 0 | 0 |
| | 7 | 31 | 30 | 25 |
| | 8 | 42 | 41 | 33 |
| | 9 | 48 | 47 | 35 |
| | 10 | 53 | 52 | 37 |
| 5 | 5 | 0 | 0 | 0 |
| | 6 | 0 | 0 | 0 |
| | 7 | 31 | 30 | 12 |
| | 8 | 43 | 42 | 18 |
| | 9 | 49 | 47 | 25 |
| | 10 | 54 | 52 | 27 |
| 6 | 6 | 0 | 0 | 0 |

TABLE 3-continued

| Recording Power | | 3 MHz | Recording Frequency 4 MHz | |
|---|---|---|---|---|
| $P_0$(mW) | $P_1$(mW) | C/N(dB) | C/N(dB) | Residual Signal Recorded at 3 MHz C/N(dB) |
| | 7 | 30 | 32 | 0 |
| | 8 | 44 | 46 | 0 |
| | 9 | 50 | 52 | 0 |
| | 10 | 55 | 56 | 0 |
| 7 | 7 | 0 | 0 | 0 |
| | 8 | 40 | 42 | 0 |
| | 9 | 45 | 47 | 0 |
| | 10 | 52 | 54 | 0 |
| 8 | 8 | 0 | 0 | 0 |
| | 9 | 6 | 8 | 0 |
| | 10 | 15 | 17 | 0 |

As can be understood from the table 3, it is preferable to effect the over-write with the aid of the laser light beam of the low power level $P_0$ of 6–7 mW. When $P_0$ is set to 6 mW, the high power level $P_1$ is preferably determined to be larger than 8 mW, and when $P_0$ is set to 7 mW, $P_1$ is preferably set to be higher than 9 mW.

It should be noted that the ferrimagnetic material may have compositions other than that described above as long as the compensation temperature is higher than the room temperature. According to the invention, it is essential to change the vertical component of the external magnetic field abruptly. To this end, in the embodiment explained above, the magnet 2 has the sharp tip shaped substantially conically. Further, a magnet may be arranged near the objective lens 3 in such a manner that opposite polarities of the magnets are faced with each other. Moreover, in order to satisfy the necessary relationship between the temperature characteristic of the coercive force and the magnitude of the external magnetic field, the peak position of the external magnetic field may be shifted with respect to the center axis of the laser light beam in the direction in which the record medium and the laser light beam are moved relatively.

As explained above, in the method according to the invention the laser light beam having the low and high power levels corresponding to the bivalent signals to be recorded is made incident upon the record medium including the ferrimagnetic material whose compensation temperature is higher than the room temperature, so that portions of the record medium on which the light beams having the low and high power levels, respectively are made incident are heated to the temperature $T_0$ higher than the room temperature $T_{room}$, but lower than the compensation temperature $T_{comp}$ and to the temperature $T_1$ higher than the Curie temperature $T_c$. Then, the bivalent signals can be recorded by utilizing the relation between the coercive force and the external magnetic field regardless of the dimension of the light beam spot on the record medium. Therefore, the over-write can be carried out positively and accurately without being affected by the variation of the room temperature and the previously recorded information can be effectively erased.

What is claimed is:

1. A method of recording bivalent signals on an opto-magnetic record medium including a ferrimagnetic material whose compensation temperature is higher than an operating temperature, but is lower than a Curie temperature, by projecting a laser light beam upon the record medium and applying an external magnetic field, comprising:

modulating the intensity of the laser light beam in accordance with one of the bivalent signals into a high power level by means of which the ferrimagnetic material is heated to a first temperature which is higher than the Curie temperature, so that said one of the bivalent signals is recorded under such a condition that the direction of the magnetization is determined at a temperature higher than the compensation temperature, but lower than the Curie temperature; and modulating the intensity of the laser light beam in accordance with the other of the bivalent signals into a low power level by means of which the ferrimagnetic material is heated to a second temperature which is higher than the operating temperature, but is lower than the compensation temperature, so that said other of the bivalent signals is recorded under such a condition that the direction of the magnetization is determined at a temperature higher than the operating temperature, but lower than the compensation temperature.

2. A method according to claim 1, wherein the external magnetic field is abruptly decreased in accordance with increase of a distance from a position at which the light beam is irradiated.

3. A method according to claim 2, wherein the external magnetic field has an intensity lower than a minimum coercive force of the ferrimagnetic material within a temperature range from the operating temperature to the compensation temperature, at a position at which the coercive force of the ferrimagnetic material during a cooling period after the end of the irradiation of the light beam becomes higher than the external magnetic field.

4. A method according to claim 3, wherein said ferrimagnetic material has a composition $(Tb_x Dy_{1-x})_y(Fe_z Co_{1-z})_{1-y}$, where $0 \leq x \leq 1$, $0.13 \leq y \leq 0.21$ and $0.6 \leq z \leq 1$.

5. A method according to claim 4, wherein the record medium is formed as a disc and is rotated about its center with respect to the laser light beam and the external magnetic field.

6. A method according to claim 5, wherein the low power level of the laser light beam is set to 6–7 mW and the high power level is set to 7 to 10 mW.

7. A method according to claim 6, wherein said external magnetic field has a peak value of about 2 KOe at the center axis of the laser light beam and is decreased to about 300 Oe at a position separated from the center axis of the laser light beam by more than 100 μm, and the minimum coercive force of the ferrimagnetic material is about 1 KOe.

8. A method according to claim 7, wherein the laser light beam is modulated at a recording frequency within a range from 3 MHz to 4 MHz.

* * * * *